July 25, 1972 A. M. MARKS ET AL 3,679,451
NONGLARE COATING FOR SURFACES OF TV TUBES AND
THE LIKE AND SUCH COATED SURFACES
Filed Feb. 13, 1970

INVENTORS
ALVIN M. MARKS
MORTIMER MARKS
ARTHUR P. KENT
BY
ATTORNEYS

3,679,451
NONGLARE COATING FOR SURFACES OF TV TUBES AND THE LIKE AND SUCH COATED SURFACES
Alvin M. Marks, Whitestone, Mortimer M. Marks, Beechhurst, and Arthur P. Kent, Kew Gardens, N.Y., assignors to Marks Polarized Corporation, Whitestone, N.Y.
Filed Feb. 13, 1970, Ser. No. 11,261
Int. Cl. B44d 5/06
U.S. Cl. 117—33.3     72 Claims

ABSTRACT OF THE DISCLOSURE

Coatings for decreasing reflected images from the surface of a transparent sheet used for displays of television, radar scopes, rear projection screens, picture glass and the like are disclosed. These coatings, which are comprised of at least two intermixed incompatible discrete polymeric bodies, enhance image contrast by decreasing the reflections of external objects and ambient light from the face of the display by absorption and scattering while transmitting light images with good resolution.

BACKGROUND OF THE INVENTION

Transparent sheets of glass or plastic are used for displays of television, radar scopes, rear projection screens, picture glass, and other applications. Reflections of images from first and/or second surfaces often decrease contrast or obscure images behind these surfaces.

Prior art television tubes presently employed, have a face plate of clear transparent glass fused to the front of the tube. On the inner surface of the face plate is a thin transparent conductive coating, and a light emitting phosphor layer is provided over the conductive coating. A second glass plate, which has a neutral color and a wrinkled surface to scatter first surface light, is laminated to the outer surface of the face plate. Such prior art devices are expensive to manufacture, and may have an excessive reject factor due to lamination defects and surface defects, such as scratches. A loss of resolution occurs in such structures because of the distance between the wrinkled outer surface of the second plate and the phosphor image surface on the inside of the tube. Visual contrast is also decreased by images of external objects which are reflected too brightly and with too little diffusion.

OBJECTS OF THE INVENTION

Accordingly, it is an object of the present invention to provide a coating for the surface of transparent sheets, including the face of television and cathode ray tubes, and other surfaces, which has low reflectivity and strong scattering of light incident on its first surface and which provides a transmitted image of high contrast and high resolution in ambient light.

Another object of the present invention is to provide a glare eliminating coating composition which may be applied directly to a transparent surface as a fluid which then solidifies to a thin layer.

A further object of the present invention is to provide a glare eliminating coating composition which conceals minor defects such as scratches, bubbles or striae on the surface of a transparent sheet, for example, glass.

Still another object of the present invention in its application to television tubes is to improve resolution by decreasing the distance between the phosphor layer and the first surface of the face plate.

It is also an object of the present invention in its application to television tubes to provide a contrast enhancing glare eliminating coating composition having dissolved or suspended therein pigments and dyestuffs which selectively absorb ambient light while transmitting the peak wavelength of light emitted by the tube phosphors.

A still another object is to provide a cathode ray tube having a glare eliminating coating on its transparent face.

These and other objects will more clearly appear when taken in conjunction with the following disclosure and the accompanying drawings, wherein.

SUMMARY OF THE INVENTION

Figure 1:
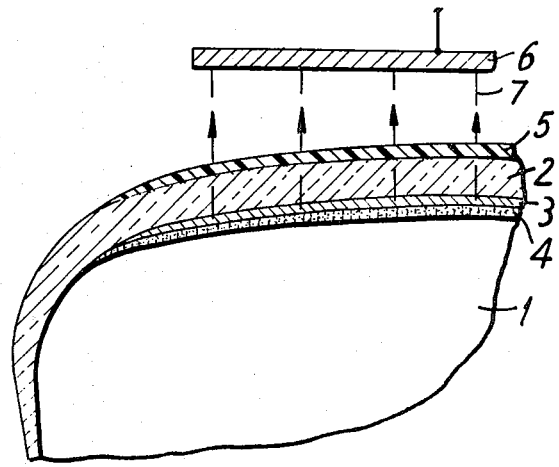
FIG. 1 shows a cross section of a conventional television tube with a nonglare coating applied to its outer face. The electric field shown is optionally used for alignment of asymmetric particles in the coating in one embodiment of this invention.

The term "nonglare coating" or "nonglare layer" as used herein is defined to mean a coating or layer which will substantially decrease or eliminate reflections of external objects and ambient light, which is applied to one or two surfaces of a transparent sheet; for example, to the outside surface of image display devices such as television tubes, radar scopes, rear projection screens, or to both surfaces of picture glass sheet and the like. The nonglare coating of this invention substantially eliminates first (and optionally, second) surface reflections of external objects and ambient light by absorbing or scattering light incident on the coating. Light images of high resolution and excellent contrast are provided even under ambient lighting conditions which "wash out" images displayed on the prior art device.

The composition of the nonglare coatings of this invention comprises a mixture of transparent or translucent dispersed incompatible organic and/or inorganic polymers which may contain pigments or dyes; and which may also have dispersed therein particles of a hard substance. In one embodiment, the particles are submicron asymmetric crystals, their long dimension aligned substantially normal to the viewing surface. A copending application Ser. No. 672,903, filed Oct. 4, 1967, discloses submicron hard particles in a polymeric matrix, and the use of oriented asymmetric particles, to produce a hard transparent material.

The invention also relates to a nonglare coating for the surface of cathode ray tubes, such as television radar tubes, which coating has transmission bands at wavelengths where the television tube phosphors have emission peaks, and absorption bands for ambient incident light elsewhere throughout the spectrum whereby the transmitted light image has increased contrast.

The submicron hard particles within the coating are employed to provide a visually uniform microscopic surface pattern, to decrease light scattering of the transmitted image, and to decrease the reflected image visibility and brightness, by increasing the adsorption and the scattering of incident light, and to increase the abrasion resistance of the coating. When the asymmetric submicron hard particles are electrically oriented, the light scatter of the transmitted images decreases, and the resolution and light transmission of the image is increased, while decreasing reflected image visibility and brightness.

The invention, from a method viewpoint, relates to a process for coating a surface with a nonglare coating comprising the steps of (1) forming a liquid composition of incompatible polymers which may or may not have a dispersion of a submicron hard substance therein; (2) coating a surface with the said coating composition; (3) allowing said composition to become more viscous; and (4) optionally, if submicron hard asymmetric particles are employed, applying an electrical field in a direction normal to the surface of the said coating to align the long axis of said asymmetric hard particles in a direction normal to the surface of the said coated surface; (5) solidifying the coating and thereby fixing the submicron hard particles, including the orientation, if any, by evaporation or the solvents in the coating composition, including an increase in the temperature.

DESCRIPTION OF THE PREFERRED EMBODIMENT

Referring to the drawings, and particularly to FIG. 1, numeral 1 indicates a television display tube, radar scope or the like, having a transparent face plate 2. A transparent electrically conductive layer 3 and a phosphor layer 4 are coated on the inner surface of the plate 2 to produce an increase in the temperature.

Figure 2:
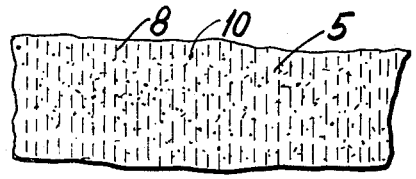
FIG. 2 shows an enlarged detail section of a non-glare coating of this invention in which the particles are asymmetric, and are aligned by an electric field (not shown)

An electrode 6, to apply the electric field 7 is used, if required, to align asymmetric particles 8, as shown in enlarged detail section FIG. 2.

Figure 3:
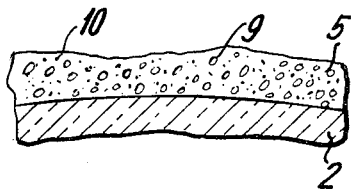
FIG. 3 shows an enlarged detail section of a non-glare coating of this invention, in which the particles are not asymmetric, not aligned, and no electric field is required.

In FIG. 3, there is shown another embodiment of a nonglare coating of this invention which utilizes non-asymmetric particles, and in which no electric field is required.

A nonglare layer 5 of the composition of this invention, hereinafter more fully described, is applied to the outer surface of the transparent plate 2 as by spin coating; or by other means such as a film applied by an adhesive. The nonglare layer 5 is preferably applied to the plate 2 as a plastic solution, which is then dried by the evaporation of solvents. The nonglare layer may have various light transmission characteristics such as a neutral color, special absorption bands for visible, and/or near ultraviolet light. The absorption of near ultraviolet light is desirable to minimize eye fatigue. The neutral color and visible absorption bands of the coating absorb the reflections from the inner surface of the plate.

Figure 4:
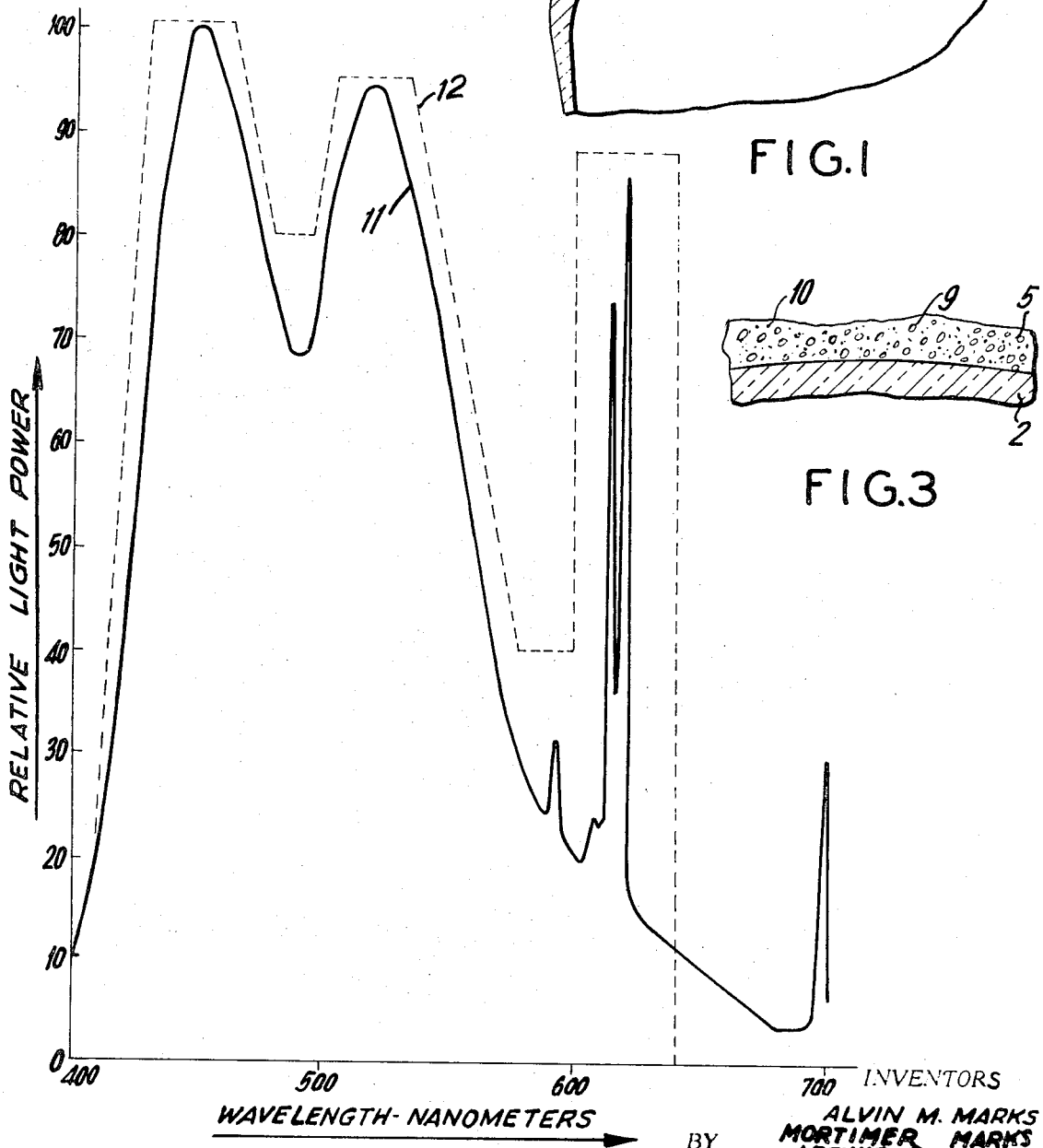
FIG. 4 is a graph showing the relative light power versus wavelength emitted from a typical color television phosphor, and an envelope of a contrast enhancing filter of this invention.

FIG. 4 shows the relative light power versus wave length in nanometers of a typical phosphor employed in a color TV tube, and the transmission curve of a contrast enhancing filter included in the nonglare coating of this invention, as an optional feature.

A particular composition for the nonglare polymeric coating of this invention comprises an intimate mixture of incompatible transparent polymer phases of polysilic acid, polyvinyl alcohol acetate copolymer, and polyvinyl butyral with or without pigments and/or dyes, which may also contain a suspension of submicron hard particles; which, in one embodiment, may comprise asymmetric microcrystalline particles, preferably aligned. Other components such as nitrocellulose may be used as a carrier for pigments. The layer formed therefrom is a thin visually uniform film which scatters and absorbs light incident on the surface of the coating and which renders reflected images substantially invisible while transmitting light images with good resolution.

The decrease in the visibility of reflected images from the surface of the nonglare coating is partly due to the strong absorption and scattering of the incident light on the surface, possibly because of differences in the indices of refraction of the separate polymeric components present as discrete bodies, e.g. submicron bodies, formed by the intimate mixture of the incompatible transparent phases.

The nonglare effect produced by the coating of this invention is much greater than would be possible by light scattering alone.

The unusually small surface reflectivity of the coating of this invention may be the result of the destructive interference of light entering a medium comprising submicron bodies, having differences in their indices of refraction, and absorbing dyes and pigments. The various incompatible components form submicron bodies in close proximity when uniformly mixed by high speed stirring. The incompatible polymeric constituents having different refractive indices are dispersed to form globules or other bodies preferably with dimensions of about ¼ wavelength of light in the medium, that is, about $\lambda/4n$; for example, 1000 A., where $\lambda=6000$ A. and $n=1.5$. An absorbing dye or pigment may be present in at least one of the dispersed phases of this invention. These discrete or submicron bodies may vary in size from about 5 to 5,000 angstroms and, more advantageously, from about 500 to about 1500 angstroms.

The prior art discloses uniform multilayer coatings on a transparent glass surface comprising alternate low and high refractive index layers which decrease reflectivity by destructive interference. This structure provides a surface reflected wave and a wave reflected from an interface between two layers. The peak of the reflected wave from the first surface coincides with the trough of the reflected wave from the interface. The reflected light power is blocked and is transmitted instead.

With the composition of the present invention, a new and unusual result is obtained. The observed decrease in reflectivity over that of an ordinary coating may be due to destructive interference in the dispersed phases proximate to the first surface of the coating whereby the light power is transmitted or absorbed rather than reflected.

The destructive interference occurs when light enters the layer 5, and splits into transmitted light rays which travel at different velocities in the different parts of the dispersed phases. When such destructive interference occurs, the light penetrates below the surface, and the light power is preferentially transmitted, converted from reflective power by internally destructive interference. Some of the reflected and transmitted light power is absorbed by the pigment or dyes dissolved or suspended in one or more of the phases.

In addition, the reflected image is further destroyed by the strong light scattering of the image which may be due to a controlled waviness of minute dimension which may be of the order of a wavelength of light caused by the spacing of the particles within the nonglare coating.

In color television, light from the phosphors is emitted as peaks in certain wavelength ranges. Between these peaks no transmission is required through the coating. Accordingly, FIG. 4 shows a preferred envelope 12 of a transmission curve 11 of a coating employed to enhance contrast.

To obtain a high contrast image from the display in ambient light, absorbing materials 10 (shown as dots in FIGS. 2 and 3) may be provided in the coating 5 to absorb incident ambient light between the emission peaks of the phosphor, and to transmit the light emitted from the phosphor with little attenuation.

FIGS. 2 and 3 show two enlarged views of the nonglare coating of this invention. The particles 8 or 9 have a much greater hardness than the polymeric matrix in which they are carried. The particles 9 may be selected from one or more hard nonasymmetric crystalline materials, such as silicon dioxide; or from asymmetric hard particles 8, such as silicon carbide, aluminum oxide, tungsten carbide, diamond, and the like, having a plate or rod shape with a length to thickness ratio of 3 or more, and preferably 10 to 30, and a hardness of at least 6 on the Moh's scale. For good resolution of the image, the particles preferably have a long dimension of less than a few microns; and a width of preferably 0.2 micron or less. The hard particles may be transparent, or light absorbing. As for example, in FIG 2, hard particles 8 are preferably alpha silicon carbide whiskers which are rod shaped and have a length not exceeding a few microns and thickness not exceeding about 0.2 micron. For optimum characteristics, it is preferred that the submicron hard asymmetric particles have a length of about 2000 A. and a thickness of 50–200 A.

Alternatively, silicon carbide platelets may be used broken from larger silicon carbide crystals, as by crushing and by separation techniques known to the art. These silicon carbide particles are irregular platelets usually of somewhat hexagonal shape.

For the preparation of nonglare sheets, compositions of this invention herein disclosed are prepared and applied by dipping, spinning, or coating from a roller or trough, on one or both sides.

In a preferred method of the present invention, the nonglare coating composition is prepared and applied to the outer surface of the TV tube by a spin coating, in which the entire tube is rotated at a suitable speed and the coating material flowed on and spread by the spinning action as described in copending application Ser. No. 696,613, filed Jan. 9, 1968. The coating is then dried and heated to expel all solvents to cause it to reach full hardness.

When the material contains asymmetric submicron crystals which are to be aligned normal to the surface of the coating, the coating is uniformly spread over the surface of the tube, for example by spinning, and the coating is then partially dried until its viscosity is increased. An electrical field is then applied normal to the surface of the coating to align the asymmetric particles 8 as shown in FIGS. 1 and 2. The alignment persists when the field is removed.

When the electrical field is applied, in addition to becoming aligned, the particles 8 mutually repel each other and move into a more or less uniform spacing. As a result, the surface texture of the coating becomes more uniform. The scattering of light transmitted by the tube is decreased because the cross section of the particles is decreased by alignment; while the scattering of the first surface reflected light is increased by submicron irregularities induced on the surface of the nonglare coating.

A plane surface of a transparent material having an index of refraction of about 1.5 will reflect about 4% of incident light in air. In prior art television tubes, the image is viewed through a glass plate which has a wrinkled surface. The apparent reflectivity of this prior art surface was measured at the peak reflection angle using a photocell having an aperture of .003 m. (3 mm.) at a distance of about 0.3 m. from the curved tube face. Since light reaching the eye of the observer decreases inversely as the square of the distance, apparent reflectivity due to light scatter is further decreased at a viewing distance of about 3 meters by a factor of about 100. The apparent reflectivity, transmission and resolution of prior art wrinkled glass "nonglare" surface was compared with the "nonglare" coating of Example III of the present invention. The following data was obtained:

TABLE 1.—COMPARISON OF THE NONGLARE SURFACES

| Coating designation | Resolution, 15 lines/mm. | Percent apparent reflectivity | Percent transmission |
|---|---|---|---|
| (1) Nonglare surface of wrinkled glass | 15-15+ | 1.40 | 45 |
| (2) Nonglare coating of Example III | 15-15+ | 0.14 | 59 |

The results of the comparison of the apparent reflectivity of the prior art "nonglare" wrinkled glass surface with the coating of the present invention shows that the nonglare coating of the present invention has 10 times less glare than the wrinkled glass surface with greater transmittance and equal resolution. The hardness and abrasion resistance was tested and found satisfactory to withstand ordinary usage. The test passed involved rubbing with a pumice and water slurry at a pressure of 15 p.s.i., with no visible scratches resulting therefrom.

The following specific examples illustrate various embodiments of the present invention:

MATERIALS AND SOURCES OF SUPPLY (1) Ethyl alcohol used was completely denatured Fotocol B-1 from Commercial Solvents Corporation.
(2) The submicron silica $SiO_2$ particles were fumed "silica" 50–100 A. in diameter obtained from Vitro Labs.
(3) Polyvinyl butyral B–74 obtained from Monsanto.
(4) Polyvinyl alcohol acetate copolymer D–383 from Monsanto.
(5) Silicon carbide flakes-Crystollon 1000 from Norton Company.
(6) Silicon carbide flakes-Crystollon 2600 from Norton Company.

EXAMPLE 1

An example of a nonglare coating according to this invention utilizing asymmetric particles as shown in FIG. 2 follows:

The coating material is made up of the following:

| "A" | Parts by weight (grams) | Solids |
|---|---|---|
| Normal propanol | 500. | |
| Ethyl alcohol [1] | 200. | |
| Acrilene orange | 0.16 | |
| Brilliant green crystals | 0.15 | 0.43 |
| Calcozine Red BX | 0.12 | |
| Polyvinyl butyral [3] | 100. | 100.00 |
| Total | 800.43 | 100.43 |

12.5% solids in the mixed solvents; 0.43% dyes in solids.

The solvents are mixed and the dyes are added and agitated until dissolved. The polyvinyl butyral is then added, and stirred vigorously until dissolved.

| "B" | Parts by weight (grams) | Solids |
|---|---|---|
| Normal propanol | 300. | |
| Ethyl alcohol [1] | 100. | |
| Polyvinyl alcohol-acetate copolymer [4] | 200. | 200 |
| Total | 600. | 200 |

Solids in the mixed solvents=33⅓%.

"C"

A hydrolyzed tetraalkyl orthosilicate solution is prepared which contains 25% polyisilicate polymer, or polysilicic acid, calculated as $SiO_2$ in solution.

The preparation follows:

| | Parts by weight |
|---|---|
| 1% aqueous solution of HCl | 15 |
| Tetraethyl orthosilicate | 85 |
| | 100 |

The tetraethyl orthosilicate is hydrolized by the addition of acidified water in stoichiometric proportions, such that that water is entirely utilized in the reaction. An inorganic polysilicate polymer remains, which is dissolved in ethyl alcohol at a concentration of 24.5%.

The mixture is agitated for about 5 minutes until a clear solution is formed. During the agitation stage, the solution rises in temperature to about 60° C. This temperature is then maintained for about one hour thereafter by placing a closed jar containing the solution in the air oven at 60° C. The solution is then allowed to cool to room temperature and cooled further to 10°–15° C. in a refrigerator, in which it may be stored and used within 4 or 5 days.

If the coating is to be applied to the face of the tube by spinning, the following coating composition is prepared:

| "D" | Parts by weight (grams) | Solids | Percent solids* |
|---|---|---|---|
| "A" | 80 | 10 | 25 |
| "B" | 30 | 10 | 25 |
| "C" | 80 | 20 | 50 |
| Butyl acetate | 100 | | |
| Acetone | 20 | | |
| Total | 310 | 40 | 100 |

*Percent solids in the coating after drying.
NOTE.—Percent solids in the coating composition=129%.

The tube is held in a rotatable jig with its viewing face in a horizontal position. The tube is spun at approximately 240 r.p.m. and the spinning composition applied thereto at the center of the tube face. The tube is spun for about five seconds and brought to a half by suitable braking means in about two seconds. During this time, the coating composition will have spread over the viewing face of the tube in a uniform layer having a thickness of about $2 \times 10^{-3}$ cm.

EXAMPLE II

To improve the hardness of this nonglare coating, minute oriented asymmetric particles, such as silicon carbide, are included within the coating as follows:
A suspension of SiC is prepared as follows:

"E"
Silicon carbide flakes [5][6] _____ 25
"B" _____ 75
_____
100

Suspension "E" is allowed to stand overnight and then centrifuged at 1300 r.p.m. for 20 minutes (Crystollon–2600). The supernatant liquid is then further centrifuged at 3150 r.p.m. for approximately 45 minutes. The resulting paste "F" is dispersed in the following:

"G"
"D" _____ 98.6
"F" _____ 1.4
_____
100.0

The coating "G" is applied by spinning as described above, and while the coating is moderately viscous, an electric field at incipient breakdown strength of about 20 kv./cm., is applied normal to the face of the tube to align the particles. While low frequency AC may be employed, alignment is better at frequencies from 5 to 50 kHz., at which frequencies a smaller electric field intensity may be used. The coating is then dried in a moderately warm atmosphere, for example 55° C., for one-half hour followed by heating at 150° C. for another half hour. The electric field is maintained until the coating is sufficiently viscous so that the asymmetric particles remain oriented normal to the face of the tube, and spaced from each other by mutual repulsion.

EXAMPLE III

An example of a nonglare coating according to this invention utilizing irregular particles, as shown in FIG. 3, follows:

(1) PREPARATION

| "H" | Totals | Solids | Percent solids* |
|---|---|---|---|
| Polyvinyl butyral [3] | 50.0 | 50 | 55.5 |
| Submicron silica [2] | 40.0 | 40 | 44.5 |
| n-Propanol | 287.5 | | |
| Ethyl alcohol [1] | 115.0 | | |
| Total | 492.5 | 90 | 100.0 |

*Percent solids in the coating after drying.
NOTE.— Percent solids in the mixed solvents=18.3%.

(2) PROCEDURE

Weight out n-propanol, ethyl alcohol and silica in a suitable container and mix for about 10 minutes at high speed in a blender. Add 40% of the formula amount of the polyvinyl butyral and mix in the blender for about two hours. Cool in a cold water bath when necessary after mixing, add the rest of the polyvinyl butyral and agitate on shaker until it is all in solution. Then use a high speed homogenizer for about 5 minutes.

| "I" | Totals | Solids | Percent solids* |
|---|---|---|---|
| Polyvinyl alcohol acetate copolymer | 100.0 | 100 | 71.4 |
| Submicron silica [2] | 40.0 | 40 | 28.6 |
| n-Propanol | 150.0 | | |
| Ethyl alcohol [1] | 50.0 | | |
| Acetone | 70.0 | | |
| Total | 410.0 | 140 | 100.0 |

*Percent solids on the dry basis.
NOTE.—Percent solids in the mixed solvents=34.2%.

(2b) PROCEDURE

Weigh out n-propanol, ethyl alcohol, acetone and polyvinyl alcohol acetate copolymer in an appropriate vessel. Agitate in shaker until it is all in the solution. Transfer to cooled blender and add the silica in 5 to 10 gram intervals, mixing thoroughly between additions. After all the silica is added, use high speed homogenizer for 5 minutes.

| "J" | Totals | Solids | Percent solids* |
|---|---|---|---|
| Cellutate black | 0.75 | 0.75 | 14.3 |
| Acridine orange | 2.00 | 2.00 | 38.1 |
| Bacoplast OAP | 0.75 | 0.75 | 14.3 |
| Calofost spirit black ZRB | 1.25 | 1.25 | 23.8 |
| Plasto yellow VVF | 0.50 | 0.50 | 9.5 |
| Acetone | 394.75 | | |
| Total | 400.00 | 5.25 | 100.0 |

*Percent solids on the dry basis.

(3) FORMULATION

"K"
"H" _____ 50.0
"I" _____ 20.5
"C" _____ 40.0
"J" _____ 50.0
Ethylene chloride _____ 23.0

In this formulation, the pyridine oxide acts as a crosslinkink agent.

(4) NONGLARE LAYER FROM COMPOSITION "K"

Using the solution formulation of composition "K," a nonglare coating is produced by coating a transparent substrate with the "K" solution and evaporating away the solvent to leave a hardened layer as described below having the following approximate composition:

Nonglare layer: Percent solids by wt.
  Polyvinyl butyral _____ 18
  Polyvinyl acetate alcohol copolymer _____ 18
  Polysilic acid (as $SiO_2$) _____ 35
  Dyes total _____ 2.5
  Submicron silica _____ 20
  Pyridine oxide _____ 6.5
_____
100.0

(5) COATING PROCEDURE

The coating composition "K" is spun on at 250 r.p.m. for five seconds. The coating is dried at 55° C. for 30 minutes and then heated at 150° C. for 70 minutes.
These nonglare coatings of this example were accepted for commercial use on TV tubes after tests as to hardness, abrasion and scratch resistance and nonglare properties. Comparative test results are shown in Table 1 above.

Referring now to FIG. 4, the broken line 12 shows the envelope of a transmittance curve of a filter on the face of a TV or Radar Cathode Ray Tube which will transmit the emitted wavelength 11 from the phosphor and which will absorb ambient light incident on the tube between the wavelength peaks.

The contrast enhancement filter emitter may be separate but is preferably included as suitable dyes or pigments added to the nonglare coating composition of this invention. For ultraviolet absorption, the yellow dye shown in Example III may be employed. Alternatively, a preferred ultraviolet absorbent may be employed, such as 2,2'-dihydroxy 4,4'-dimethoxy benzophenone, which may be dissolved in the solvent.

A known absorber for the 486 nm. band range may be employed. For example porphine dissolved in dimethylformamide has the desired spectra. Its molar extinction coefficient is very nearly 16,000 at this wavelength and its solubility is 0.57 gram per liter of dimethylformamide. Porphine has a similar spectra in tetrahydrofuran with the solubility of about 1.87 grams per liter of solvent. The solubility of porphine is less in alcohol, even in the presence of tetrahydrofuran. The latter has a boiling point of 64–65° C. and, in this respect, is very similar to methyl alcohol. Other ethers, such as diglyme which boils at 161° C., may be employed which correspond to the higher alcohols. Metal porphyrins, such as lead 2,4-diformyl deuteroporphyrin or equivalent have absorption bands near 486 nm., and the solubilities and extinction coefficients may be greater than those of porphine by a factor of 10, that is, the absorbence is nearly 100 times as great as that of porphine in tetrahydrofuran.

Known absorbents for the 595 nm. band may be used, for example, metal porphines having sharp absorption bands in this region and whose molar extinction coefficient would be about 15,000.

Known absorbents for the 620 nm. range may be employed, for example, lithium or berylium phthalocyanine, which are soluble in ethyl or methyl alcohol. Alternatively, zinc tetraphenylchlorin may be employed.

One or more of these absorbents are incorporated, for instance, in the composition of Example III, to obtain a suitable curve falling within the envelope suggested indicated by the broken line 12 of FIG. 4.

The contrast enhancing filter as described above is particularly useful for employment with color TV tubes. The absorbing dyes and pigments selected to function within the curve envelope are determined by the emission spectra of the phosphors employed. It is understood further that other phosphors with different emission peaks may be employed and that corresponding changes may then be made in the envelope of the transmission required, and that other absorbing dyes and pigments are then employed to obtain this new transmittance curve.

The hardness and abrasion resistance of the nonglare coating of the present invention, and its adhesion to glass, is extraordinary. The composition comprised of Example III incorporates submicron silica particles chemically bound together by a polysilicate matrix and chemically bound to glass, which is also primarily silicate. These chemical links may be shown as SiO—SiO—SiO which continue from the surface of the glass support through the matrix to the submicron silica particles in the matrix, and also to the hydroxyl groups on the organic polymer which splits off water and forms a —SiOC— bond.

Summarizing the invention, a nonglare transparent layer is provided for use on a transparent support or substrate, the layer comprising a uniform dispersion of at least two incompatible discrete polymeric bodies of preferably submicron size. Organic polymers are particularly advantageous, and especially those incompatible organic compositions having a cross linking agent included therein. As described hereinbefore, a nonglare composition found particularly advantageous is one comprised of the incompatible organic compounds polyvinyl butyral and polyvinyl acholol acetate, copolymer, the cross linking agent, by way of example, being a polysilicate.

The nonglare layer or coating of the foregoing type may optionally have hard submicron particles uniformly dispersed therethrough of hardness on the Moh's scale of at least about 6, the amount of hard particles ranging from about 0.1 to 30% by weight. Such hard submicron particles may be selected from the group consisting of silica, alumina, silicon carbide, tungsten carbide and diamond. Advantageously, the hard particles may be asymmetrical in shape, e.g. rods or flakes, with their major axes oriented substantially normal to the surface of the layer.

The nonglare composition may optionally have a colorant present selected from the group consisting of dyes or pigments for selectively absorbing certain wavelengths of light, such as ultraviolet radiation. Thus, by employing dyes or pigments, the mean transmission of the layer to visible light may vary between about 10 to 85% and, more preferably, between about 40 to 60%. In the case where the nonglare layer is employed on the outside face of a color television tube, having a phosphor light emitting layer on its inner face, the dyes or pigments may be selected to transmit the peak emission wavelengths of the phosphor light emitting layer and to absorb at wavelengths where the phosphor has little or no light emission so as to achieve contrast enhancement through the selective absorption of ambient light and the selective transmission of light emitted from the phosphor.

An example of a preferred composition for the nonglare layer is one containing about 5 to 25% polyvinyl butyral, about 5 to 25% polyvinyl acetate alcohol copolymer, about 10 to 50% polysilic acid (as $SiO_2$), up to about 5% of a dye or pigment, e.g. 0.1 to 5%, up to about 40% submicron silica, e.g. about 10 to 40%, and up to about 10% pyridine oxide, e.g. about 1 to 10%, the total ingredients making up 100% by weight of the composition.

The invention is particularly applicable in the production of nonglare glass, the glass being coated with a liquid formulation of the composition, the solvent being thereafter evaporated by drying at, for example, 55° C. for 30 minutes, and thereafter heated at a high temperature, e.g. 150° C. for 70 minutes.

The invention also provides a method for applying the nonglare layer to a transparent surface, wherein intermixed incompatible polymeric materials are dissolved in an evaporable solvent to provide a solution which is coated on a substrate, such as the outside face of a cathode ray tube, to form a fluid layer which is hardened by evaporating away the solvent.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A nonglare transparent coating on a support, said coating comprising at least two kinds of intermixed incompatible discrete polymeric bodies, and said discrete polymeric bodies having irregular geometric configurations.

2. A nonglare coating on a transparent support according to claim 1, in which the two incompatible discrete polymeric bodies are submicron in size and are incompatible organic polymers.

3. A nonglare coating according to claim 1, containing a colorant selected from the group consisting of dyes or pigments, such that the mean transmission of the layer to visible light varies between 10 and 85%.

4. A nonglare coating according to claim 3 for color TV tubes, having a phosphor light emitting layer on its inner face, said tube in which said dyes or pigments are selected to transmit the peak emission wavelengths of the said phosphor light emitting layer, and to absorb at wavelengths where the said phosphor has little or no light emission, whereby contrast enhancement is achieved through the selective absorption of ambient light and the selective transmission of light emitted from the phosphor.

5. A nonglare coating according to claim 4, in which yellow dyes or pigments are employed to absorb ultraviolet light.

6. The nonglare coating of claim 5, in which the ultraviolet absorber comprises 2,2' dihydroxy 4,4' dimethoxy benzophenone dissolved in the composition of the coating.

7. A nonglare coating on a transparent support according to claim 1, wherein said intermixed discrete polymeric bodies comprise at least one organic polymer and at least one inorganic polymer.

8. A nonglare coating on a transparent support according to claim 1, wherein said incompatible polymeric bodies have indexes of refraction different from one another, and all of said incompatible polymeric bodies having a mean index of refraction of about 1.5.

9. A nonglare coating on a transparent support according to claim 8, wherein said polymeric bodies are in the form of globules, and said globules are submicron in size.

10. A nonglare coating on a transparent support according to claim 9, wherein the dimensions of said globules are in the order of $\lambda/4n$, where $\lambda$ is the wavelength of light in substantially the visual range and $n$ is the mean index of refraction of said incompatible polymeric globules.

11. A nonglare coating on a transparent support according to claim 2, wherein said incompatible organic polymers comprise about 5 to 25% polyvinyl butyral, about 5 to 25% polyvinyl acetate alcohol copolymer, and the remainder comprises polysilicic acid, and the total ingredients making up 100% by weight of the composition.

12. A nonglare coating on a transparent support according to claim 11, including as an ingredient of said composition from about 0.1 to 5% of a dye or pigment.

13. A nonglare coating on a transparent support according to claim 12, including as an ingredient of said composition from about 1 to 10% of pyridine oxide.

14. A nonglare coating on a transparent support according to claim 13, including as an ingredient of said composition from about 10 to 40% of submicron silica.

15. A nonglare coating on a transparent support according to claim 14, wherein the amount of polysilicic acid is specifically from about 10 to 50% of said composition.

16. The nonglare coating according to claim 1, containing as a third component a cross linking agent for the incompatible organic polymers.

17. The nonglare coating according to claim 16, in which the incompatible organic components comprise polyvinyl butyral and polyvinyl alcohol acetate copolymer and in which the cross linking agent is a polysilicate.

18. The nonglare coating according to claim 16, comprising essentially by weight of about 5 to 25% polyvinyl butyral, about 5 to 25% polyvinyl acetate alcohol copolymer, about 10 to 50% polysilicic acid (as $SiO_2$), about 0.1 to 5% of a dye or pigment, about 10 to 40% of submicron silica, and about 1 to 10% pyridine oxide, the total ingredients making up 100% by weight of the composition.

19. A nonglare coating on a transparent support according to claim 16, wherein said incompatible organic polymers comprise about 5 to 25% polyvinyl butyral, about 5 to 25% polyvinyl acetate alcohol copolymer, and the remainder comprises polysilicic acid, and the total ingredients making up 100% by weight of the composition.

20. A nonglare coating on a transparent support according to claim 19, including as an ingredient of said composition from about 0.1% to 5% of a dye or pigment.

21. A nonglare coating on a transparent support according to claim 20, including as an ingredient of said composition from about 1 to 10% of pyridine oxide.

22. A nonglare coating on a transparent support according to claim 21, wherein the amount of polysilicic acid is specifically from about 10 to 50% of said composition.

23. A nonglare coating on a transparent support, said coating comprising at least two kinds of intermixed incompatible discrete polymeric bodies, and said discrete polymeric bodies being submicron in size.

24. A nonglare coating on a transparent support according to claim 23, wherein said discrete intermixed polymeric bodies comprise at least one organic polymer and at least one inorganic polymer.

25. A nonglare coating on a transparent support according to claim 23, wherein said intermixed polymeric bodies are incompatible organic polymers.

26. A nonglare coating according to claim 25, containing as a third component a cross linking agent for the incompatible organic polymers.

27. The nonglare coating according to claim 26, in which the incompatible organic components comprise polyvinyl butyral and polyvinyl alcohol acetate copolymer and in which the cross linking agent is a polysilicate.

28. A nonglare coating according to claim 26, comprising essentially by weight of about 5 to 25% polyvinyl butyral, about 5 to 25% polyvinyl acetate alcohol copolymer, about 10 to 50% polysilicic acid (as $SiO_2$), about 0.1 to 5% of a dye, about 10 to 40% of submicron silica, and about 1 to 10% pyridine oxide, the total ingredients making up 100% by weight of the composition.

29. A nonglare coating according to claim 23, containing dispersed therein from about 0.1% to 30% by weight of submicron hard particles whose Moh's hardness exceed about 6.

30. The nonglare coating according to claim 29, wherein the submicron hard particle is selected from the class including silica, alumina, silicon carbide, tungsten carbide and diamond.

31. A nonglare coating according to claim 29, in which the submicron hard particles are asymmetric rods or plates which are oriented with their major dimension normal to the surface of said coating.

32. A method of applying a nonglare coating on a transparent support, said coating comprising at least two kinds of intermixed incompatible discrete polymeric bodies, wherein the intermixed incompatible polymeric materials are each dissolved in an evaporable solvent to provide a solution, wherein the solution is coated on said support to provide a fluid coating layer, and wherein said layer is subsequently hardened by evaporating the evaporable solvent.

33. The method of claim 32, wherein the fluid layer has hard asymmetrical submicron particles dispersed uniformly therethrough, wherein said particles are aligned by an electrical field normal to the surface of the layer while it is still fluid, and wherein the alignment of the particles is fixed by evaporating the evaporable fluid while the electric field is applied to maintain the desired orientation of said particles.

34. The method of claim 32, wherein the fluid layer has hard irregular particles dispersed uniformly therethrough.

35. A method of applying a nonglare coating of a composition comprising at least two kinds of intermixed incompatible discrete polymeric bodies to an image-receiving face of a cathode ray tube which comprises, formulating said composition in an evaporable solvent to provide a solution thereof, coating said face of the cathode ray tube with said solution to provide a fluid layer, and evaporating the evaporable solvent from the fluid layer, whereby to provide a hardened nonglare coating on the face of said cathode ray tube.

36. The method of claim 35, wherein the fluid layer has hard asymmetrical submicron particles dispersed uniformly therethrough, wherein said particles are aligned by an electrical field normal to the surface of the layer while it is still fluid, and wherein the alignment of the particles is fixed by evaporating the evaporable fluid while the electric field is applied to maintain the desired orientation of said particles.

37. The method of claim 35, wherein the fluid layer has hard irregular particles dispersed uniformly, therethrough.

38. A cathode ray tube having a transparent image-receiving face and a nonglare transparent coating adhering thereto, said coating comprising at least two kinds of intermixed incompatible submicron polymeric bodies.

39. The cathode ray tube with a coating according to claim 38, in which the two incompatible polymeric bodies forming the coating are incompatible organic polymers.

40. The cathode ray tube with a coating according to claim 39, wherein said incompatible organic polymers comprise about 5 to 25% polyvinyl butyral, about 5 to 25% polyvinyl acetate alcohol copolymer, and the remainder comprises polysilicic acid, and the total ingredients making up 100% by weight of the composition.

41. The cathode ray tube with a coating according to claim 40, including as an ingredient of said composition from about 0.1 to 5% of a dye or pigment.

42. The cathode ray tube with a coating according to claim 41, including as an ingredient of said composition from about 1 to 10% of pyridine oxide.

43. The cathode ray tube with a coating according to claim 42, including as an ingredient of said composition from about 5 to 40% of submicron silica.

44. The cathode ray tube with a coating according to claim 43, wherein the amount of polysilicic acid is specifically from about 10 to 50% of said composition.

45. The cathode ray tube with a coating according to claim 39, wherein the coating contains as a third component a cross linking agent for the incompatible organic polymers.

46. The cathode ray tube with a coating according to claim 45, in which the incompatible organic components comprise polyvinyl butyral and polyvinyl alcohol acetate copolymer and in which the cross linking agent is a polysilicate.

47. The cathode ray tube with a coating according to claim 45, in which the nonglare coating comprises essentially by weight of about 5 to 25% polyvinyl butyral, about 5 to 25% polyvinyl acetate alcohol copolymer, about 10 to 50% polysilicic acid (as $SiO_2$), about 0.1 to 5% of a dye, about 10 to 40% of submicron silica, and about 1 to 10% pyridine oxide, the total ingredients making up 100% by weight of the composition.

48. The cathode ray tube with a coating according to claim 38, containing dispersed therein from about 0.1% to 30% by weight of submicron hard particles whose Moh's hardness exceed about 6.

49. The cathode ray tube with a coating according to claim 48, wherein the submicron hard particles are selected from the class including silica, alumina, silicon carbide, tungsten carbide and diamond.

50. The cathode ray tube with a coating according to claim 48, in which the submicron hard particles are asymmetric rods or plates which are oriented with their major dimension normal to the surface of said coating.

51. The cathode ray tube with a coating according to claim 38, in which the coating contains dyes or pigments, such that the mean transmission of the coating to visible light varies between about 10 and 85%.

52. The cathode ray tube with a coating according to claim 51, in the form of a color TV tube having a phosphor light emitting layer on its inner face, the dyes or pigments in said tube being selected to transmit the peak emission wavelengths of the said phosphor light emitting layer and to absorb at wavelengths where the said phosphor has little or no light emission, whereby contrast enhancement is achieved through the selective absorption of ambient light and the selective transmission of light emitted from the phosphor.

53. The cathode ray tube with a coating according to claim 52, in which yellow dyes or pigments are employed in the coating to absorb ultraviolet light.

54. The cathode ray tube with a coating according to claim 52, in which the ultraviolet absorber comprises 2,2' dihydroxy 4,4' dimethoxy benzophenone dissolved in the composition of the coating.

55. The cathode ray tube with a coating according to claim 38, wherein said intermixed discrete polymeric bodies comprise at least one organic polymer and at least one inorganic polymer.

56. The cathode ray tube with a coating according to claim 38, wherein said incompatible polymeric bodies have indexes of refraction different from one another, and all of said incompatible polymeric bodies having a mean index of refraction of about 1.5.

57. The cathode ray tube with a coating according to claim 56, wherein said incompatible submicron polymeric bodies are in the form of globules.

58. The cathode ray tube with a coating according to claim 57, wherein the dimensions of said globules are in the order of $\lambda/4n$, where $\lambda$ is the wavelength of light in substantially the visual range and $n$ is the mean index of refraction of said incompatible polymeric globules.

59. A cathode ray tube having a transparent image-receiving face and a nonglare transparent coating adhering thereto, said coating comprising at least two kinds of intermixed incompatible polymeric bodies, and said discrete polymeric bodies having irregular geometric configurations.

60. The cathode ray tube with a coating according to claim 59, wherein said intermixed discrete polymeric polymeric bodies comprise at least one organic polymer and at least one inorganic polymer.

61. The cathode ray tube with a coating according to claim 59, in which the two incompatible polymeric bodies forming the coating are incompatible organic polymers.

62. The cathode ray tube with a coating according to claim 61, wherein the coating contains as a third component a cross linking agent for the incompatible organic polymers.

63. The cathode ray tube with a coating according to claim 62, in which the incompatible organic components comprise polyvinyl butyral and polyvinyl alcohol acetate copolymer and in which the cross linking agent is a polysilicate.

64. A nonglare glass consisting essentially of a glass substrate having a nonglare coating thereon comprising at least two kinds of intermixed incompatible discrete polymeric bodies, and said discrete polymeric bodies having irregular geometric configurations.

65. The nonglare glass of claim 64, wherein the two incompatible discrete polymeric bodies are submicron in size and are incompatible organic polymers.

66. The nonglare glass of claim 65, wherein the nonglare coating includes as a third component a cross linking agent for the incompatible organic polymers.

67. The nonglare glass of claim 66, wherein the incompatible organic components comprise polyvinyl butyral and polyvinyl alcohol acetate copolymer, and wherein the cross linking agent is a polysilicate.

68. The nonglare glass of claim 64, wherein said coating contains a dispersion of from about 0.1% to 30% by weight of submicron hard particles whose Moh's hardness exceed 6.

69. The nonglare glass of claim 64, wherein said intermixed discrete polymeric bodies comprise at least one organic polymer and at least one inorganic polymer.

70. The nonglare glass of claim 64, wherein said incompatible polymeric bodies have indexes of refraction different from one another, and all of said incompatible polymeric bodies having a mean index of refraction of about 1.5.

71. The nonglare glass of claim 70, wherein said polymeric bodies are in the form of globules, and said globules are submicron in size.

72. The nonglare glass of claim 71, wherein the dimensions of said globules are in the order of $\lambda/4n$, where $\lambda$ is the wavelength of light in substantially the visual range and $n$ is the mean index of refraction of said incompatible polymeric globules.

References Cited

UNITED STATES PATENTS

| | | | |
|---|---|---|---|
| 2,387,556 | 6/1942 | Land | 161—3.5 |
| 2,400,877 | 5/1946 | Dreyer | 117—124 D |
| 2,706,262 | 4/1955 | Barnes | 117—124 D |
| 2,584,441 | 2/1952 | Fredendall | 161—3.5 |
| 3,398,018 | 8/1968 | Walters | 117—124 E |
| 3,552,822 | 1/1971 | Aljman | 117—33.3 X |

ALFRED L. LEAVITT, Primary Examiner

J. H. NEWSOME, Assistant Examiner

U.S. Cl. X.R.

117—93, 105.4, 124 D; 118—52, 56, 319, 320, 620, 640; 161—1, 3.5, 162, 192, 193, 199, 204, 408, 409; 178—7.82, 7.86; 220—2.1 A; 313—92, 112; 350—126

UNITED STATES PATENT OFFICE
CERTIFICATE OF CORRECTION

Patent No. 3,679,451             Dated July 25, 1972

Inventor(s) ALVIN M. MARKS et al.

It is certified that error appears in the above-identified patent and that said Letters Patent are hereby corrected as shown below:

Column 1, line 59, "the" should read -- then -- ; line 66, after "improve", insert -- image -- . Column 2, lines 14 and 17, "non-glare" should read -- nonglare -- ; line 66, "adsorption" should read -- absorption -- . Column 3, line 15, "or" should read -- of -- ; line 26, "increase in the temperature" should read -- image in a well-known manner -- . Column 4, line 72, "micron" should read -- microns -- . Column 5, line 2, "mi "micron" should read -- microns -- . Column 6, line 42, "Narmal" should read -- Normal -- ; line 53, "polyisilicate' should read -- polysilicate -- . Column 7, line 14, "129%" should read -- 12.9% -- ; line 19, "half" should read -- halt --. Column 8, line 1, "(2)" should read -- (2a) -- ; line 3, "Weight" should read -- Weigh -- ; line 24, cancel "the"; line before line 46, insert -- Pyridine-oxide......2.0 -- ; line 49, "linkink" should read -- linking -- . Column 9, line 52, after "transmission", insert -- curve -- .

Signed and sealed this 20th day of November 1973.

(SEAL)
Attest:

EDWARD M. FLETCHER, JR.          RENE D. TEGTMEYER
Attesting Officer                Acting Commissioner of Patents